United States Patent
Hesse et al.

(10) Patent No.: US 10,058,953 B2
(45) Date of Patent: Aug. 28, 2018

(54) METHOD FOR MONITORING AND CONTROLLING A LASER CUTTING PROCESS

(71) Applicant: TRUMPF Werkzeugmaschinen GmbH + Co. KG, Ditzingen (DE)

(72) Inventors: Tim Hesse, Ditzingen (DE); David Schindhelm, Stuttgart (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 15/419,190

(22) Filed: Jan. 30, 2017

(65) Prior Publication Data

US 2017/0136573 A1 May 18, 2017

Related U.S. Application Data (63) Continuation of application No. 13/961,596, filed on Aug. 7, 2013, now abandoned, which is a continuation of application No. PCT/EP2012/051634, filed on Feb. 1, 2012.

(51) Int. Cl.
  *B23K 26/04* (2014.01)
  *B23K 26/03* (2006.01)
  *B23K 26/38* (2014.01)

(52) U.S. Cl.
  CPC ............ *B23K 26/032* (2013.01); *B23K 26/38* (2013.01)

(58) Field of Classification Search
  CPC ..... B23K 26/032; B23K 31/125; B23K 26/38
  USPC .............. 219/121.62, 121.6, 121.63, 121.71, 219/121.73, 121.74, 121.7, 121.83
  See application file for complete search history.

(56) References Cited

U.S. PATENT DOCUMENTS

| 5,011,626 A |   | 4/1991  | Ma et al. |
|---|---|---|---|
| 5,140,127 A |   | 8/1992  | Stroud et al. |
| 5,463,202 A |   | 10/1995 | Kurosawa et al. |
| 5,589,090 A | * | 12/1996 | Song .................... B23K 26/032 |
|             |   |         | 219/121.62 |

(Continued)

FOREIGN PATENT DOCUMENTS

| CN | 101898280 A | 12/2010 |
|---|---|---|
| DE | 4336136 A1 | 7/1994 |

(Continued)

OTHER PUBLICATIONS

Transmittal of Translation of the International Preliminary Report on Patentability for corresponding PCT Application No. PCT/EP2012/051634, dated Aug. 13, 2013, 6 pages.

*Primary Examiner* — Phuong Nguyen
(74) *Attorney, Agent, or Firm* — Fish & Richardson P.C.

(57) ABSTRACT

The present disclosure relates to a device for monitoring and for controlling a laser cutting process on a workpiece, and a method of using the same. The device includes an image capturing apparatus for capturing an image of a region of the workpiece to be monitored, in which the region of the workpiece to be monitored includes a region of interaction of a laser beam with the workpiece, and an evaluation apparatus for detecting material boundaries of the workpiece using the captured image. The evaluation apparatus is configured to determine at least one characteristic value of the laser cutting process based on a geometric relationship between at least two of the detected material boundaries, the region of interaction, or combinations thereof.

5 Claims, 4 Drawing Sheets

(56) References Cited

U.S. PATENT DOCUMENTS

| | | |
|---|---|---|
| 5,698,120 A | 12/1997 | Kurosawa et al. |
| 6,054,673 A | 4/2000 | Chen |
| 6,311,099 B1 | 10/2001 | Jasper et al. |
| 6,455,807 B1 | 9/2002 | Scott |
| 2003/0052104 A1 | 3/2003 | Matsumoto et al. |
| 2008/0000888 A1 | 1/2008 | Schulz et al. |
| 2008/0006615 A1 | 1/2008 | Rosario et al. |
| 2009/0001063 A1 | 1/2009 | Weick et al. |
| 2009/0050612 A1 | 2/2009 | Serruys et al. |
| 2011/0108533 A1 | 5/2011 | Boettcher et al. |
| 2011/0120982 A1 | 5/2011 | Sepp et al. |
| 2011/0278277 A1 | 11/2011 | Stork Genannt Wersborg |

FOREIGN PATENT DOCUMENTS

| | | |
|---|---|---|
| DE | 10036146 C1 | 1/2002 |
| DE | 10129751 A1 | 1/2002 |
| DE | 10256262 A1 | 6/2004 |
| DE | 102005024085 A1 | 11/2006 |
| DE | 102008030783 B3 | 8/2009 |
| DE | 102008030374 A1 | 12/2009 |
| DE | 102008053397 A1 | 12/2009 |
| DE | 102008051459 A1 | 5/2010 |
| EP | 1728581 A1 | 12/2006 |
| EP | 1886757 A1 | 2/2008 |
| JP | 06000673 A | 1/1994 |
| JP | 07116885 A | 5/1995 |
| JP | 11320149 A | 11/1999 |
| WO | WO1991004828 A | 4/1991 |
| WO | WO2010057661 A1 | 5/2010 |

\* cited by examiner

METHOD FOR MONITORING AND CONTROLLING A LASER CUTTING PROCESS

CROSS REFERENCE TO RELATED APPLICATIONS

This application is a continuation of and claims priority under 35 U.S.C. § 120 to U.S. Ser. No. 13/961,596, filed Aug. 7, 2013, which claims priority to PCT Application No. PCT/EP2012/051634 filed on Feb. 1, 2012, which claimed priority to German Application No. 10 2011 003 717.9 filed on Feb. 7, 2011. The contents of these priority applications are hereby incorporated by reference in their entirety.

TECHNICAL FIELD

The present disclosure relates to a device for monitoring and for controlling a laser cutting process on a workpiece.

BACKGROUND

An example of a device for monitoring a laser cutting process is disclosed in DE 10 2005 024 085 A1. To monitor a laser machining process, the device described in that reference has, inter alia, a camera and an imaging apparatus, which images the region from the zone of interaction or the region of interaction between laser beam and workpiece to be observed on the camera. The output signals from the camera are fed to an evaluation circuit, which processes both the signals from the camera and the signals from a radiation-sensitive receiver, and are used to characterize the course of the laser machining operation. Here, the radiation-sensitive receiver and the camera can cover different spectral ranges. No further information is given about the features used for characterization or the specific evaluation thereof.

The reference WO 91/04828 likewise discloses a monitoring apparatus, in which a camera arranged on the laser machining head, coaxially with the optical axis of a laser beam guided in the direction of the workpiece, is used for focal position determination during a laser cutting process. Here, the camera detects a zone of interaction between laser beam and workpiece and, by using the width of the zone of interaction, conclusions are drawn about the focal position or about the distance between laser machining head and workpiece.

The reference DE 10 2008 051 459 A1 discloses a further such monitoring apparatus which, in particular, is used for edge detection during the layer by layer machining of bodies by means of laser radiation. The device comprises an imaging detector for forwarding a digital image, converted into gray stages or true-color/color-coded, to a data processing system.

The reference DE 43 36 136 C2 describes a method for laser machining in which the laser light reflected at the workpiece, together with generated secondary light, passes back to a laser oscillator and there, with the aid of a mirror, some of the laser light and of the secondary light is separated off. The secondary light is captured by an optical sensor, separately from the laser light component, and a control signal for controlling the laser machining is derived from the remaining secondary light component. In one exemplary embodiment, the surface of the workpiece is irradiated and the reflected radiation passing through a nozzle opening is detected in order to determine a cutting path or cutting point during the laser cutting. The position of the cutting point is compared with the center of the nozzle in order to control the laser cutting process such that the position of the cutting point coincides with the center of the nozzle. In addition, by using the observation of the nozzle opening, the deformation or a blockage of the nozzle opening is determined. Furthermore, in relation to nozzle eccentricity, the reference EP 1 728 581 A1 discloses a device and a method for aligning a laser beam with the nozzle center, in which an image of an illuminated nozzle and a focused laser beam respectively are captured and related to each other via an image evaluation unit.

Furthermore, in order to detect material burn-up, an example of monitoring the shaping of the cutting front ("red heat region") is known from the reference JP 07116885. If the latter expands, the system changes over to using an inert gas as cutting gas instead of oxygen. For the same purpose or to distinguish between correct and incorrect machining, the reference JP 11320149 discloses an assessment by using a comparison between captured optical signals. In the reference DE 101 29 751, in order to detect material burn-up, the temperature of the workpiece in the vicinity of the cut is monitored by using infrared temperature measuring apparatus and is compared with a temperature limit.

On the basis of the foregoing references, cited by way of example, it becomes clear that the capturing and evaluation of a multiplicity of characteristics determining the quality of the laser cutting process on the basis of devices and methods based on various capturing and evaluation principles is very complex. This relates both to the structure of the device itself and to the signal processing.

However, via the devices described above and the associated methods for evaluating the process images captured, no complete image which would be suitable for characterizing the entire laser cutting process results. In particular, the cut quality itself is inadequately reproduced and control is not carried out comprehensively over the entire process course. In this connection, the entire process course is understood not only as the cutting operation as such but it is also possible for the process course to comprise both the piercing operation and also a plurality of successive laser cuts within the context of a process sequence.

SUMMARY

The present disclosure relates to devices for monitoring and for controlling a laser cutting process on a workpiece, in which the devices include: an image capturing apparatus for capturing an image of a region of the workpiece to be monitored, which in particular comprises a region of interaction of a laser beam with the workpiece, and an evaluation apparatus for detecting material boundaries, in particular edges of the workpiece, by using the captured image. The disclosure also relates to methods for monitoring, in particular for controlling, a laser cutting process, comprising the steps of: capturing an image of a region of the workpiece which is to be monitored, which in particular comprises a region of interaction of laser beam with the workpiece, and evaluating the captured image in order to detect material boundaries, in particular edges, of the workpiece The devices and methods disclosed herein permit the serial or parallel capturing and evaluation of a large number of features which characterize a laser cutting process.

According to an aspect of the disclosure, a device includes an evaluation apparatus configured to determine a characteristic value, in particular a cut quality, of the laser cutting process by using a geometric relationship between at least two of the detected material boundaries and/or by using the region of interaction.

In order to monitor the laser cutting process, it is proposed to capture an image of a detail (i.e. of a monitored region) of the workpiece, which typically can comprise the zone of interaction between the laser beam and the workpiece during a piercing operation or a cutting operation, i.e. during a relative movement between laser beam and workpiece, and a cut gap that is forming or has already been formed. The evaluation unit can detect two or more material boundaries by using the captured image and, by using a geometric relationship between the material boundaries, determine at least one characteristic value of the cutting process. Additionally or alternatively, given a suitable choice of the detected wavelength range, for example in the near infrared (NIR) range, a thermal image or process autoluminescence of the monitored region, in particular of the zone of interaction, can be captured and the evaluation apparatus can determine at least one characteristic value of the laser cutting process by using the thermal image or the process autoluminescence. Detection of the process luminescence is also possible with the aid of UV radiation, in this case the radiation originating from a plasma generally being detected.

In particular, in the device the characteristic values can be determined with the aid of one and the same capturing and evaluation logic unit, so that the structure of the device and the performance of the method are simplified. Here, the evaluation apparatus is designed or programmed to determine or to calculate the characteristic values by using the data supplied by the capturing apparatus.

In the device, by using a few process-induced geometric features that can be captured by the capturing unit or the zone of interaction, a multiplicity of variables or process features to be used for the process monitoring and/or control can be determined with the aid of the evaluation unit. The characteristic values supplied by the evaluation unit can be used for the control of the laser machining process via an assessment which can be carried out both in the evaluation unit itself and also in a logic unit (e.g. a control apparatus) connected downstream thereof.

As characteristic values, it is possible to determine, for example: crater formation during the piercing operation, gap width, failed cut, and material burn-up (self-burning) during the cutting process, cut quality (burr formation) during the cutting process, and disruptive influences, for example as a result of inadequate nozzle spacing and non-process-synchronous switching on and/or switching off of the laser beam. These quality-determining characteristic values for the process monitoring and/or control also include the cutting front angle. The determination of the aforementioned characteristic values will be described in detail below.

In some embodiments, the evaluation apparatus is designed to detect cut edges of a cut gap as material boundaries formed during the laser cutting process and to determine a gap width of the cut gap as characteristic value. The detected cut edges typically run parallel to each other, so that the gap width, i.e. the distance between the cut edges, is substantially constant and can be determined in a straightforward way.

In further embodiments, the evaluation apparatus is designed to detect material burn-up of the workpiece if a predefined gap width of the cut gap is exceeded and/or in the event of too rapid an increase in the gap width of the cut gap. Material burn-up leads to a widening of the cut edges and of the cutting front which can possibly be so great that, within the monitored detail (e.g. in the event of imaging through a cutting gas nozzle), the cut edges can no longer be detected but only the (substantially semicircular) cutting front. If the danger of material burn-up is detected in good time, e.g. by comparing the cut gap width with a reference value which should not be exceeded, suitable countermeasures can be taken, e.g. the supply of oxygen can be interrupted or reduced in order to counteract the material burning. Further possibilities for the early detection of material burn-up will be presented further below.

In further embodiments, the evaluation apparatus is designed to detect a failed cut if the cut gap falls below a predefined gap width. Alternatively or additionally, a failed cut can be detected by means of the comparison of the area of the observed cutting front with a reference area, which corresponds to the area of the cutting front in a good or quality cut. A failed cut can also be detected if the radiation intensity emitted by the reference area exceeds a limiting value for the reference brightness in the case of a normal cut. This limiting value has previously been determined empirically by the brightness of the reference area having been measured during a laser cutting process in which a good cutting result was achieved.

In further embodiments, the evaluation apparatus is designed to detect cut edges formed during the laser cutting process as material boundaries and to determine a gap center of the cut gap as characteristic value. The gap center can be determined by the variable distance between the cut edges being determined at several points perpendicular to the feed direction. Determining the cut gap width at several points along the cut gap is beneficial since, even during a laser cutting process, a (possibly not entirely avoidable) change in the cut gap width can occur, for example when a changeover is made between different cutting conditions (e.g. between large and small contours).

In some implementations, the evaluation apparatus is designed to determine a gap center in a further cut gap which does not run parallel to the first cut gap and, by using the two gap centers, to determine a tool center point of the laser cutting process in a plane parallel to the workpiece. The tool center, also called the tool center point (TCP), is used as a reference point, in particular as an origin, for a tool coordinate system. The TCP can be used in particular to define geometric relationships, in particular distances, between the tool (laser machining head) and material boundaries of the workpiece.

In some implementations, the evaluation apparatus is designed to determine a geometric relationship between the tool center point and at least one detected material boundary, and the device has a control apparatus for switching on or switching off the laser beam as a function of the determined geometric relationship. By using the geometric relationship, in particular the distance, between TCP and material boundary, it is possible to define the time at which the laser beam is switched on and off, so that the cut start and the cut end can be made at the desired position on the workpiece.

In some implementations, the evaluation apparatus is designed to determine a geometric relationship between the tool center point and the cut edges, in particular the gap center, of a cut gap formed during a preceding laser cutting process, the control apparatus preferably being designed to switch on or switch off the laser beam when the gap center is reached by the tool center point. In this way, it is possible to produce a smooth transition or connection between contours which are cut during successive laser cutting processes.

In some implementations, the evaluation apparatus is designed to determine a geometric relationship between the tool center point and an edge of the workpiece, and the control apparatus is preferably designed to switch on or switch off the laser beam when the edge is reached by the tool center point. Here, the edge is typically formed at the outer edge of the (plate-like) workpiece. As a result of the timely switching off and switching on of the laser beam when the edge is reached, it is ensured that no cut is made beyond the edge of the workpiece.

In further embodiments, the evaluation apparatus is designed to detect a cutting front upper edge of a workpiece surface facing the incident laser beam and a cutting front lower edge of a workpiece surface facing away from the incident laser beam as material boundaries and, from these, by taking into account the thickness of the workpiece, to determine a cutting front angle of the laser cutting process as characteristic value. The cutting front angle in a laser cutting process depends on several cutting parameters, in particular on the feed or cutting speed. If the cutting front angle deviates from a reference value or a reference range, this can point to a cutting defect, which can be corrected by suitable measures, for example adaptation of the cutting speed.

In some implementations, the evaluation apparatus is designed to capture an outer boundary and an inner boundary of a pierced hole on the workpiece as material boundaries during a piercing operation and to determine the formation of a crater on the workpiece as characteristic value. Both the chemical material composition and the surface finish of the workpiece, which can vary from manufacturer to manufacturer, have a substantial influence on the piercing operation. In particular, in the case of high metal sheet thicknesses (e.g. more than 15 mm), the piercing operation can therefore be disrupted in the event of an unfavorable material finish, in such a way that the laser beam does not drill a narrow hole but, on account of overheating and an exothermic iron-oxygen reaction that subsequently proceeds, a large conical crater is formed. The material boundaries thereof can be captured and, when a limiting value for the distance between the boundaries is exceeded, countermeasures can be initiated.

In further embodiments, the image capturing apparatus is designed to capture the region to be monitored coaxially with respect to a laser beam axis. Coaxial capturing of the region to be monitored is possible independent of direction.

In some embodiments, a distance between an image plane of the image capturing apparatus for capturing the image and an imaging and focusing optics can be varied, and the evaluation apparatus is designed, by using the detection of at least one material boundary of the workpiece with a first distance between the image plane and the imaging optics and the detection of an inner contour of a nozzle for the passage of the laser beam onto the workpiece as a material boundary with a second distance between the image plane and the imaging optics, to determine a distance between the nozzle and the workpiece. The optics assigned to the image capturing apparatus are used in this case for the sharp imaging of two objects arranged at different distances from the image plane of the image capturing apparatus, specifically by a distance between the optics (e.g., lens) and the image plane being varied. Here, the contours are only detected by the evaluation apparatus if the material boundary to be captured (nozzle or workpiece) is located within the range of the depth of focus of the optics. By using the displacement travel of the optics which is necessary to image the respective material boundary sharply, the distance between nozzle and workpiece can be determined. If necessary, a respective contour can be detected not only with one distance between image plane and optics but within a distance interval. In this case, in order to determine the nozzle distance, that distance from the interval is chosen at which the respective contour is sharpest, i.e. can be detected best.

In further embodiments, the evaluation apparatus is designed to determine the presence or lack of burr formation on the cut gap and therefore a cut quality as characteristic value of the laser cutting process by using the image, in particular by using the thermal image or the process autoluminescence in the NIR/IR range, of the region of interaction. The region of interaction or the geometry thereof can be observed here by means of the image capturing apparatus via a suitable wavelength filter which is transparent to wavelengths for example in the near infrared range or in the UV range (for the detection of the plasma luminescence above the region of interaction). The image capturing apparatus can have different detectors for capturing the material boundaries and the region of interaction. Use of a single detector, e.g. a (CCD) camera, in conjunction with a suitably adjustable wavelength filter for capturing both the material boundaries and the region of interaction is, however, both space-saving and inexpensive.

In further embodiments, the evaluation apparatus is designed, during a flame cutting process (in particular when cutting constructional steel), upon the occurrence of a local intensity minimum of the image in the region of the cutting front, to conclude that there is a good cut, in particular a lack of burr formation. In particular, in a laser beam-guided flame process, a local intensity minimum (radiation sink) occurs with respect to the environment in the region of the cutting front in the case of a good cut, i.e. with smooth cut edges without any burr formation. This local minimum typically disappears when burr formation occurs at the cut edges.

In further embodiments, the evaluation apparatus is designed, during a melting cutting process (in particular when cutting stainless steel), by using the lack of a repeating fluctuation in the radiation intensity of the (thermal) image or the process autoluminescence in the NIR/IR wavelength range in the region of the cut gap and/or upon the occurrence of three luminescent stripes originating from the cutting front, to conclude that burr formation is present. If no sporadically occurring flickering in the kerf is detected in the wake, this points to the production of whisker burr, in which the entire melt volume feeds the whisker burr, so that no flying sparks are produced which would manifest themselves as flickering in the wake. The presence of burr formation can also be detected by using two bright luminescent stripes directed rearward in the region of the two cut edges and a further luminescent stripe which, typically, runs in the center between the two outer luminescent stripes. Here, the luminescent stripes are generally comparatively long, which points to the occurrence of an azimuthal melt flow and therefore to the production of burr in the form of crumb burr, i.e. far back in the wake.

In some embodiments, the evaluation apparatus is designed to detect striations on at least one cut edge of a cut gap formed during the laser cutting process and, by using a frequency of the striations, to draw conclusions about material burn-up. The striations can be detected well by using the thermal image or the process autoluminescence but can possibly also be detected in the visible range as material boundaries. The frequency of the striations typically decreases in the region of that cut edge at which material burn-up is immediately imminent, so that suitable countermeasures can be initiated even before the occurrence of the material burn-up.

In further embodiments, the evaluation apparatus is designed to draw conclusions about material burn-up by using a rise in the total intensity and/or by using a fluctuation in the total intensity of the image of the region of interaction. The total intensity (typically detected through the nozzle opening) of the detected radiation (in the near infrared/infrared (NIR/IR range)) rises, since the zone of interaction increases in the event of material burn-up. Additionally or alternatively, material burn-up can also be determined by using an increased fluctuation in the total measured brightness value as compared with a conventional cutting process.

A further aspect of the disclosure relates to a method which includes: determining at least one characteristic value of the laser cutting process, in particular a cut quality, by using a geometric relationship between at least two of the detected material boundaries and/or by using the region of interaction. In the method for monitoring a laser cutting process, in particular the embodiments and developments described further above in conjunction with the device and with the evaluation apparatus can be implemented as further method steps, which will not be discussed in more detail below, for the purpose of simplification. In particular, it is also possible for the characteristic values of the laser cutting process cited further above to be determined in the method.

Further advantages of the disclosure can be gathered from the description and the drawing. Likewise, the features mentioned above and those cited further on can each be used on their own or in a plurality in any desired combination. The embodiments shown and described are not to be understood as a final enumeration but instead have an exemplary character for the description of the invention.

DETAILED DESCRIPTION

Figure 1:
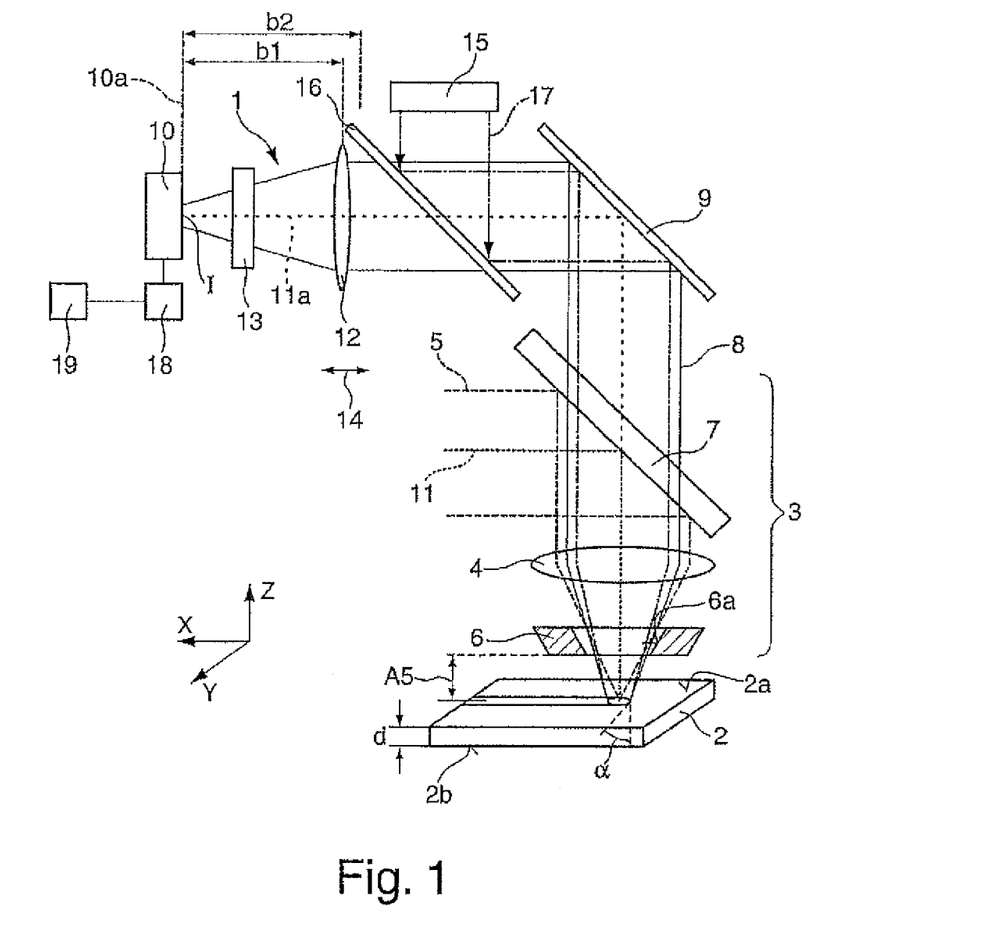
FIG. 1 shows a schematic illustration of an embodiment of a device according to the an aspect of the disclosure for monitoring and for controlling a laser cutting process, that includes an image capturing unit.

FIG. 1 shows an exemplary structure of a device 1 for process monitoring and control of a laser cutting process on a workpiece 2 by means of a $CO_2$ laser machining installation, of which only a machining unit 3 (part of a laser machining head) having a focusing lens 4 made of zinc selenide for focusing a $CO_2$ laser beam 5 of the laser machining installation, a cutting gas nozzle 6 and having a deflection mirror 7 is illustrated in FIG. 1. In the present case, the deflection mirror 7 is designed to be partly transparent and therefore forms a component on the inlet side of the device 1 for process monitoring.

The deflection mirror 7 reflects the incident $CO_2$ laser beam 5 (having a wavelength of about 10 μm) and transmits the radiation 8 that is relevant to the process monitoring, is reflected from the workpiece 2 and emitted from the zone of interaction in a wavelength range which, in the present example, lies between about 550 nm and 2000 nm. As an alternative to the partially transparent deflection mirror 7, a scraper mirror or a perforated mirror can also be used in order to feed the process radiation 8 to the device 1. However, the use of a scraper mirror typically leads to part of the process radiation being masked out and to the unmodified beam diameter being limited. The use of a perforated mirror generally leads to diffraction effects of the process radiation and to a strong influence on the $CO_2$ laser radiation.

In the device 1, after the partially transparent mirror 7 there is arranged a further deflection mirror 9, which deflects the process radiation 8 onto a geometrically highly resolving camera 10 as image capturing unit. The camera 10 can be a high-speed camera, which is arranged coaxially with respect to the laser beam axis 11 or to the extension of the laser beam axis 11a and thus directionally independently. In principle, there is the possibility of capturing the image by means of the camera 10 in the incident light method as well, i.e. in the visible wavelength range, possibly also in the NIR wavelength range, if an additional illumination source which emits in the NIR range is provided and, alternatively, the capturing of the process autoluminescence in the UV and NIR/IR wavelength ranges.

For improved imaging, in the present example, between the partially transparent mirror 7 and the camera 10 there is provided an imaging focusing optical system 12, depicted as a lens in FIG. 1, which focuses the radiation 8 that is relevant to the process monitoring on the camera 10. By means of an aspherical form of the imaging optical system or the focusing lens 12, aspherical aberrations during the imaging can be prevented or at least reduced.

In the example shown in FIG. 1, a filter 13 in front of the camera 10 is advantageous if further radiation or wavelength components is/are to be excluded from the capturing with the camera 10. The filter 13 can be formed, for example, as a narrowband bandpass filter with a low full width at half maximum in order to avoid or to reduce chromatic aberrations. The position of the camera 10 and of the imaging optical element 12 and/or the filter 13, present in the present example, along the laser beam axis 11 can be adjusted and varied as required by a positioning system 14 known to those skilled in the art, illustrated by a double arrow for the purpose of simplification.

In the present example, the camera 10 is operated in the incident light method, i.e. an additional source of illumination 15 is provided above the workpiece 2 and, via a further partially transparent mirror 16, couples illumination radiation 17 into the beam path, coaxially with respect to the laser beam axis 11. As an additional source of illumination 15, laser diodes, for example having a wavelength of 658 nm, or diode lasers, for example having a wavelength of 808 nm, can be provided and can be arranged coaxially, as shown in FIG. 1, but also off-axis with respect to the laser beam axis 11. The additional source of illumination 15 can also, for example, be arranged outside (in particular beside) the machining unit 3 and be aimed at the workpiece 2; alternatively, the source of illumination 15 can be arranged inside the machining unit 3 but not aimed at the workpiece 2 coaxially with respect to the laser beam 5.

Figure 2:
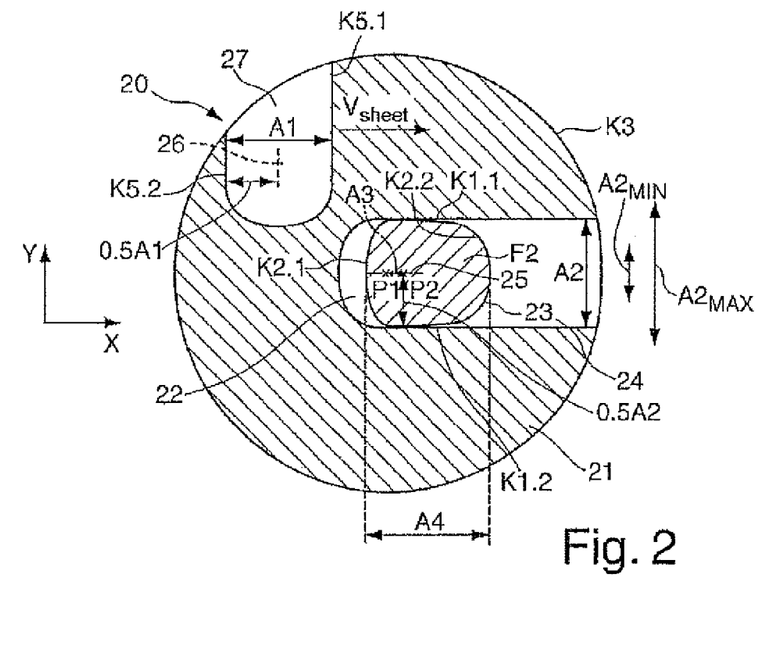
FIG. 2 shows an illustration of an image of the workpiece, captured by the image capturing unit, by which several characteristic values of the cutting process are determined.

As shown in FIG. 2, the camera 10 captures a highly resolved image 20 of a region 21 (detail) to be monitored of the workpiece 2. The image 20 is delimited by the circular inner contour 6a (cf. FIG. 1) of the nozzle 6.

In the example illustrated in FIG. 2, the image 20 shows the region 21 to be monitored during a laser melt cutting process, in which the workpiece 2 is moved in a feed direction $V_{sheet}$ relative to the nozzle 6 and to the machining unit 3 (laser machining head). Alternatively or additionally, the relative movement between the workpiece 2 and the nozzle 6 or the machining unit 3 (laser machining head) can be executed by the movement of the nozzle 6 or the machining unit 3. During the melt cutting process, a region of interaction 22, 23 is formed between the laser beam 5 and the workpiece 2, which region comprises a heat forerunner zone 22 and a cutting front 23, which are adjoined in the feed direction $V_{sheet}$ by a cut gap 24 (also designated kerf below).

An evaluation apparatus 18 shown in FIG. 1 is used to evaluate the image 20 and in particular to detect material boundaries within the monitored region 21 on the upper side 2a and the underside 2b of the workpiece 2. The evaluation apparatus 18 has a signal connection to a control apparatus 19, likewise shown in FIG. 1, which controls and regulates the laser cutting process, specifically as a function of characteristic values of the laser cutting process determined by the evaluation apparatus 18.

Amongst other things, by using the camera image 20, the following features of a laser cutting process can be determined by the evaluation unit 18 in order to determine characteristic values: material boundaries on the workpiece upper side 2a and underside 2b, in particular edges of the workpiece, nozzle edge and nozzle center of the laser machining nozzle, geometric dimensions of the kerf (not only opposite cut edges but also the region of the zone of interaction, e.g. of the cutting front), position of the kerf relative to the nozzle edge/center, or position of already cut regions relative to the current cutting position, among other features. The detection of these and further features for determining characteristic values of the laser machining process will be described in more detail below.

In the example shown in FIG. 2, as characteristic value, the gap width A2 of the kerf 24 is determined on the basis of the high resolution camera image 20, by the evaluation unit 18 detecting the cut edges K1.1 and K1.2 of the kerf 24 and the spacing thereof, which coincides with the cut gap width A2. In the case of a laser cutting process, the cut edges K1.1, K1.2 generally run (virtually) parallel, so that the cut gap width A2 is (virtually) constant, in particular in a good cut.

The evaluation unit 18 itself or logic unit connected downstream thereof, e.g. the control apparatus 19, is able to determine, via the comparison with a reference cut width that is defined previously and stored for comparison, whether for example when the cut gap width falls below a minimum $A2_{min}$, a failed cut is present, i.e. a complete lack of a kerf, or when the cut gap width exceeds a maximum $A2_{max}$, material burn-up (self-burning) is present or, in the case of an oxygen flame cut of structural steel, washouts (pits) are present.

Alternatively or additionally, material burn-up can also be determined via the (time) change in the cut gap width A2—both with regard to an absolute change and via the rate of change. A number of evaluation methods relating to the gap width can also be used in parallel. Material burn-up leads to a widening of the cut edges K1.1, K1.2 and the cutting front 23, which can possibly become so large that the cut gap 24 becomes wider than the nozzle opening 6a or the nozzle contour K3, so that the cut edges K1.1, K1.2 in the monitored region 21 are no longer detectable. Here, the image 20 shown in FIG. 2 of the cut gap 24 with the virtually parallel cut edges K1.1, K1.2 changes to a quasi-semicircular cutting front and the detail 21 of the workpiece 2 exhibits only a radius corresponding to the cutting front. In the event of material burn-up, the cutting front does not end directly with the laser beam 5 either but is displaced in front of the latter since, in this case, the cutting gas dominates the burning process.

Alternatively or additionally to falling below the minimum spacing $A2_{min}$, a failed cut can be detected by using an area F2 which is formed between a front edge K2.1 and a rear edge K2.2 of the detected cutting front 23. For this purpose, the area F2, which corresponds to the projection of the cutting front 23 in the XY plane, is related to a reference area. A failed cut is present if the area F2 reaches the size of the reference area, the ratio reference area/F2 is therefore equal to one. The reference area in this case corresponds to the area of the projected cutting front in the case of a good cut, i.e. in the case of a cut with good cutting quality. A failed cut can additionally be detected if the brightness of the cutting front 23 is greater than in the case of a reference good cut, it being possible for the luminescence to occur continuously and/or sporadically and the luminescent area being approximately equal to or greater than the kerf width A2.

By using an image 20, as illustrated in FIG. 2, pits during the oxygen flame cutting of structural steel can also be detected if these begin from above (i.e. from the workpiece upper side 2a), specifically by using a non-periodic increase in the cut gap width A2 or by using the (at least temporary) loss of parallelism between the cut gap edges K1.1, K1.2. When observing process luminescence, as will be described below in conjunction with FIGS. 7A-C and FIG. 8, pits can also be detected via a drop in brightness and via the occurrence of flashes, i.e. short and intensive increases in the brightness in the region of the cutting front 23, to be specific typically in a punctiform manner on the outside of the cutting front, in the region of the transition to the parallel cut edges K1.1, K1.2.

In addition to the determination of a failed cut or material burn-up or pits, via the kerf width A2 it is also possible to determine the position of the tool center P2, which will also be designated TCP (Tool Center Point) below. The position of the latter in the Y direction is defined by a center line 25, which extends parallel and centrally in relation to the opposite cut edges K1.1, K1.2 of the kerf 24. The position of the TCP P2 can additionally also be determined in the X direction, specifically as a center line between the edges K5.1, K5.2 of a further kerf 27 which, in the example shown in FIG. 2, has been produced in a preceding laser cutting process (with feed direction in the Y direction). By using the two kerfs 24, 27, the tool center point P2 can be defined unambiguously in the XY plane (parallel to the workpiece surface). In principle, instead of the kerf 27 shown extending at right angles to the kerf 24, any other kerf not extending parallel to the kerf 24 can be used to determine the tool center point P2 in the XY plane.

The tool center point P2 determined in this way can be used for adjusting and monitoring the nozzle position of the cutting nozzle 6 through which the laser beam 5 passes, specifically by means of reference to the nozzle center P1. The nozzle center P1 is determined from the circular nozzle (internal) contour K3 captured via the image capturing unit 10, the nozzle center P1 being determined as the center of the circle of the latter. In this way, a distance A3 between the nozzle center P1 and the tool center point P2 can be determined. In particular, in the event of a deviation between nozzle center P1 and tool center point P2 being detected, action can be taken in the laser cutting process with the aid of the control apparatus 19 in order to correct the position of the laser beam 5 relative to the nozzle 6, so that the tool center point P2 coincides with the nozzle center P1.

During the detection of the internal contour K3 of the nozzle 6, in particular by using the geometric shape of the cutting nozzle, information can also be obtained about mechanical damage to the latter, specifically by deviations from the (typically circular) reference contour of the nozzle 6 being detected. The damage can be produced, amongst other things, by a collision of the nozzle 6 with the workpiece 2, by support webs (not shown) or other interfering contours or by a high level of laser beam eccentricity (in relation to the nozzle center P1), in which the laser beam 5 touches the nozzle inner edge 6a and as a result melts the latter locally. As a result of such damage, which can generally not be detected by the machine operator, the cutting gas dynamics and thus the cut quality can be changed detrimentally.

By using the illustrations of FIG. 2 and FIG. 1, the determination of the cutting front angle during a laser cutting process will be explained below. In order to determine the cutting front angle, first a distance A4 between the cutting front upper edge K2.1 and the cutting front lower edge K2.2 is determined which, as described above, are detected as material boundaries with the aid of the evaluation apparatus 18. The cutting front angle a shown in FIG. 1 is given by the trigonometric function $\alpha=\arctan(A4/d)$ from the distance A4 between cutting front upper edge K2.1 and lower edge K2.2, measured along the gap center 25, and from the thickness d of the workpiece 2.

With the aid of the device 1 from FIG. 1, it is also possible to determine a distance A5 between the cutting gas nozzle 6 and the workpiece 2, more precisely the workpiece upper side 2a. For this purpose, the lens 12 installed upstream of the image capturing unit 10 is displaced along the optical axis 11 with the aid of the positioning system 14, so that a distance between an image plane 10a of the image capturing apparatus 10 for capturing the image 20 and the lens 12 change. At a first distance b1 between image plane 10a and lens 12, the workpiece 2 and the upper side 2a lies within the range of the depth of focus of the image capturing apparatus 10, so that at least one material boundary of the workpiece 2, e.g. the cut edges K1.1, K1.2, can be detected. At a second distance b2, the nozzle 6 lies in the range of the depth of focus of the image capturing apparatus 10, so that the evaluation apparatus 18 detects an internal contour K3 of the nozzle 6 as material boundary. By using the difference b1-2 between the two distances b1, b2 at which the nozzle internal contour K3 and the cut edges K1.1, K1.2 are detected by the evaluation apparatus 18, the distance A5 between the nozzle 6 and the workpiece 2 can be calculated.

Figure 3:
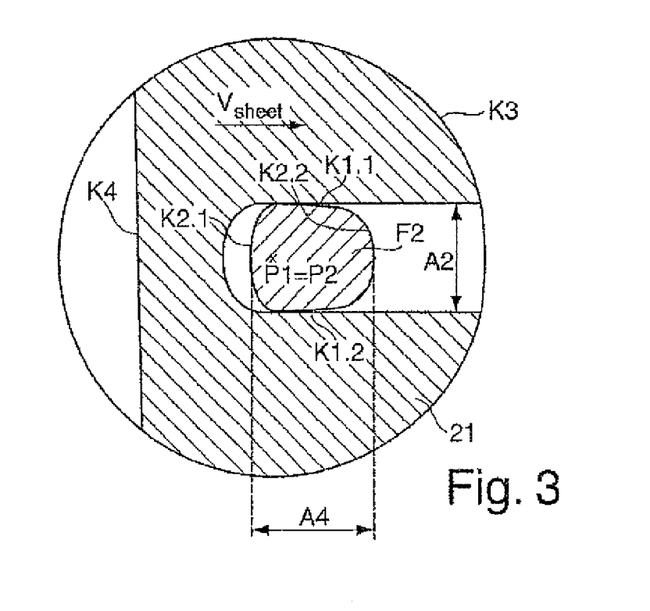
FIG. 3 shows an illustration of an image of the workpiece, by which a cut end on a sheet-metal edge of the workpiece is detected.

FIG. 3 shows cut end detection when reaching or traveling over a metal sheet edge K4 at the outer edge of the workpiece 2. The position of the detected metal sheet edge K4 in this case is related to the tool center point P2, in order to determine a distance (not shown in FIG. 3) between the tool center point P2 and the metal sheet edge K4. By means of the knowledge of this distance, the control device 19 can switch off the laser beam 5 as soon as the latter reaches the metal sheet edge K4, so that damage to the separated workpiece 2 when it falls down by a laser beam 5 that is ignited for too long is avoided. Depending on the application, such a switch-off can also be performed before the metal sheet edge is reached by the tool center point P2, specifically as soon as the distance to the metal sheet edge K4 is sufficiently small in order still to be able to implement complete separation of the workpiece 2 despite switching off.

Figure 4:
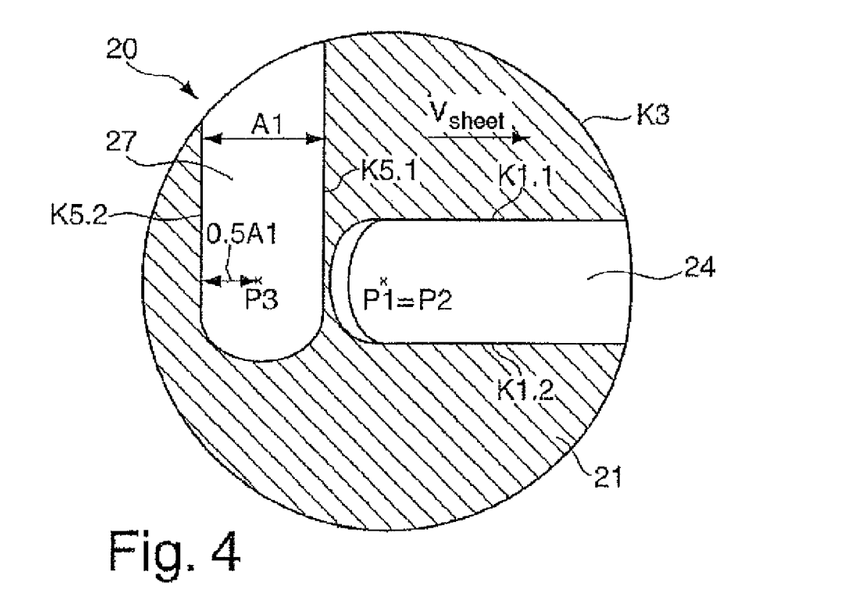
FIG. 4 shows an illustration of an image of the workpiece, by which a cut end on an already cut contour is detected.

In a way analogous to FIG. 3, FIG. 4 shows cut end detection when reaching an already cut contour, i.e. an already existing kerf 27. The laser beam 5 can be switched off in a way analogous to reaching or traveling over the metal sheet edge K4 in FIG. 3, whose role in the image 20 shown in FIG. 4 is performed by the first cut edge K5.1 pointing in the direction of the cutting process.

Alternatively, via the detection of the two already present cut edges K5.1, K5.2 of the further cut gap 27, the cut gap width Al and, from this in turn, the end point P3 of the cut gap 24 running into the kerf 27 can be defined. This end point P3 is typically arranged centrally, that is to say at the same distance (0.5 A1) from the opposite cut edges K5.1, K5.2. Depending on the application, this end point P3 can, however, also be displaced in the direction of the cut edge K5.1 reached first by the cut, for example when the incoming kerf 24 is larger than the kerf 27 running transversely thereto and already present. In the opposite case, i.e. when the incoming kerf 24 is smaller than the kerf 27 running transversely thereto, a reverse displacement of the end point P3 can likewise be beneficial, as long as the laser beam 5 is at least switched off in such a timely manner that damage to the rear cut edge 5.2 of the further kerf 27 is avoided.

In general, by means of the detection of the relative position of an already generated kerf 27 in relation to a tool center point (TCP) P2 found in the process, a path deviation can also be detected and, if a tolerance range is exceeded, can be corrected with the aid of the control device 19.

Figure 5:
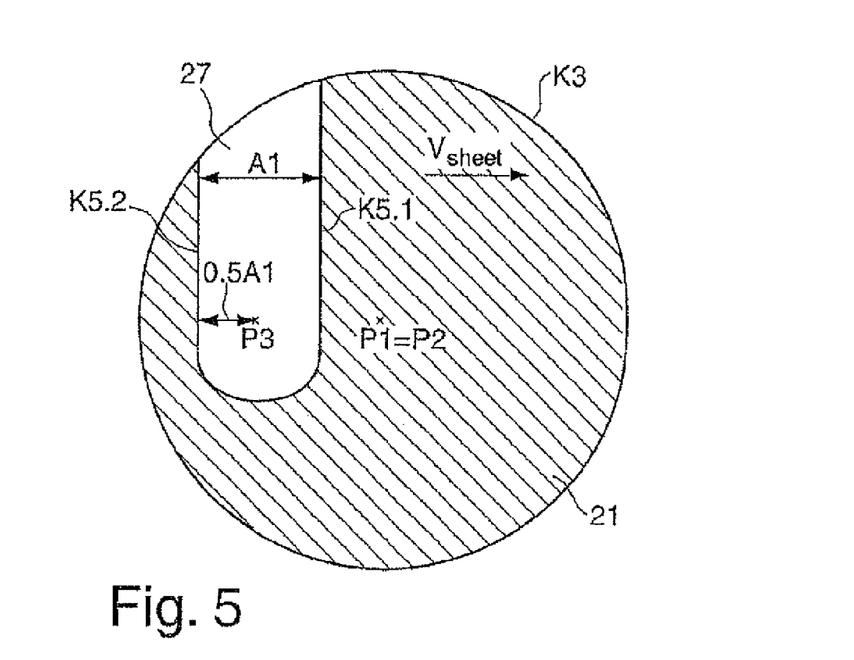
FIG. 5 shows a further illustration of an image of the workpiece, by which a cut start is detected.

The case illustrated in FIG. 5 of the detection of the cut start is carried out in a way comparable to the detection of the cut end described in FIG. 3 and FIG. 4. As opposed to the cut end detection, however, the laser beam 5 is not switched off but switched on or connected as a function of the (positional) relationship of tool center point P2 to kerf 27 running transversely (or else at another angle). The detection of a cut start on a metal sheet edge K4 is carried out in a way analogous to the procedure described in conjunction with FIG. 3. Cut start detection is particularly suitable when resuming a cutting process following a failed cut or else when resuming a cutting process after a relative movement between machining unit 3 and workpiece 2, for example necessitated by clock cycles during which the laser cutting process is interrupted as needed by the process and it is necessary to start/resume at exactly the same point again at a subsequent time.

Figure 6:
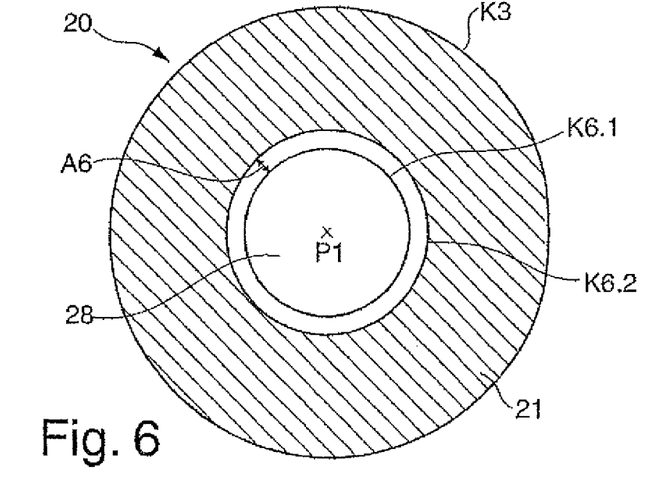
FIG. 6 shows an illustration of an image of the workpiece during a piercing operation.

FIG. 6 shows the image 20 of a region 21 of the workpiece 2 to be monitored during a piercing operation, in which a circular hole 28 is introduced into the workpiece 2. The two main influencing factors on the piercing process, namely the chemical material composition and the surface finish of the workpiece 2, can vary from manufacturer to manufacturer and from batch to batch. During the piercing operation, in particular in structural steel, e.g. with material thicknesses starting at 15 mm, problems may occur during the piercing operation on account of these differences in the material properties. The piercing operation in thick structural steel is disrupted in such a way that the laser beam does not drill a narrow hole but that, on account of the overheating and the exothermic iron-oxygen reaction that subsequently proceeds, a conical crater is formed, the contour of which is shown in FIG. 6. Here, the evaluation apparatus 18 can detect the internal contour K6.1 of the hole 28 and the outer crater edge K6.2, so that looming crater production can be detected and the control apparatus 19 can initiate suitable countermeasures, e.g. a cooling pause. The countermeasures can be initiated, for example, when a limiting value for the distance A6 between the inner boundary K6.1 and outer boundary K6.2 (crater edge) of the pierced hole 28 is exceeded. It is possible to conclude that there is crater formation when the outer contour K6.2 of the pierced hole 28 becomes so large that said contour disappears from the region 21 captured by the camera 10 through the nozzle 6.

Figure 7A:
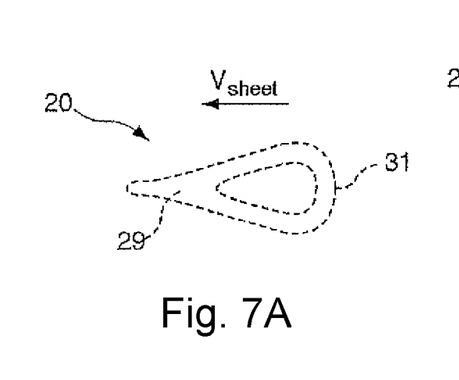
FIGS. 7A, 7B and 7C show illustrations of a thermal image of the monitored region of the workpiece during melt cutting and in the presence of a cut (FIG. 7A), a crumb burr (FIG. 7B) and a whisker burr (FIG. 7C)
Figure 7B:
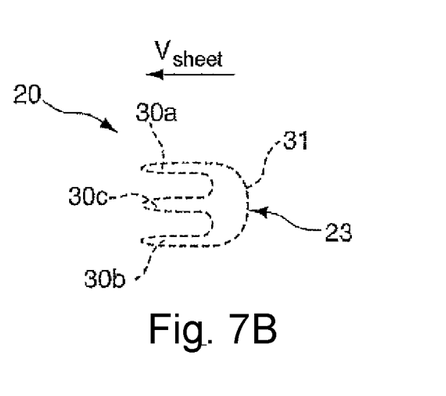
Figure 7C:
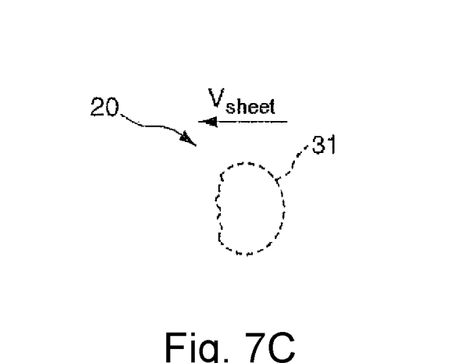

FIGS. 7A-C each show an image 20 of the process autoluminescence in the NIR/IR range of a region of interaction 31 in a melt cutting process, which image has been captured with the camera 10 by using a filter 13 which was transparent only to process radiation 8 in the (near) infrared range; the contours shown represent the boundaries between regions of different intensity of the process radiation 8 and the contours of the workpiece 2 cannot be seen. The process radiation 8 registered by the image 20 is autoluminescence of the laser cutting process, which typically comprises (at least to some extent) the melt bath. The image 20 of the process autoluminescence cannot be equated directly with a temperature distribution, since the measured intensity I (cf. FIG. 1) depends on the temperature T substantially in accordance with the following formula: $I=\varepsilon^*T^4$, where $\varepsilon$ denotes the emissivity (between 0 and 1). Since the emissivity $\varepsilon$ in the present case can be close to zero, it is difficult to derive information about the temperature from the intensity distribution. Nevertheless, for the purpose of simplification, the measured intensity distribution will occasionally also be designated a thermal image below.

By using the (thermal) images 20, the formation of burrs or their absence during laser cutting, and thus the cut quality, can be determined. Here, FIG. 7A shows the image 20 of the region of interaction 31 in which a quality cut is being produced (with virtually smooth cut edges). The region of interaction 31 exhibits a single central tail or a single luminous track 29 along the feed direction $V_{sheet}$. In addition, when observing the wake of the region of interaction 31 over a relatively long time period (several seconds), sporadic flickering additionally occurs. The shape of the region of interaction 31 shown in FIG. 7A and the sporadic flickering (i.e. the repeating increase and decrease in the brightness) can be traced back to homogenous melt expulsion which, in a quality cut, oscillates rearward and forward in the feed direction. If no flickering can be detected, this is an indication of the formation of burrs during the cutting process (and specifically of the presence of whisker burr).

FIG. 7B shows an image 20 of the region of interaction 31 in the presence of burr formation, specifically during the formation of what is known as crumb burr, in which, in the present example, two bright luminescent stripes 30a, 30b directed rearward from the cutting front 23 can be seen at the two (not shown) cut edges, as well as a further luminescent stripe 30c which runs in the middle between the two outer luminescent stripes 30a, 30b. The luminescent stripes 30a-c here are comparatively long, which points to the occurrence of an azimuthal melt flow with production of crumb burr far behind in the wake.

The image 20 of the region of interaction 31 shown in FIG. 7C likewise points to the formation of burr, specifically what is known as whisker burr. In this case, no tail or luminescent stripe can be seen, since the complete melt volume feeds the whisker burr. In addition, no flying sparks occur directly underneath the cutting gas nozzle 6, so that in this case no flickering occurs; instead, the laser cutting process proceeds without noticeable fluctuations in the detected intensity of the process radiation 8.

Figure 8:
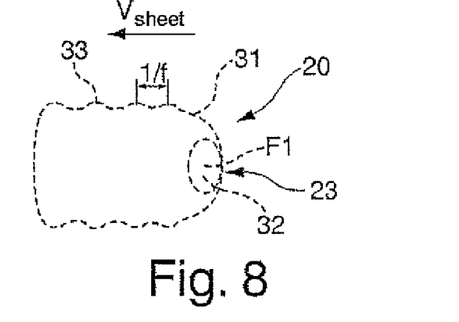
FIG. 8 shows an illustration of a thermal image during flame cutting in the presence of a cut.

FIG. 8 shows a thermal image 20 or an image of the process autoluminescence in the NIR/IR range, such as occurs in a structural steel flame cutting process (using oxygen as cutting gas). In such a process, the upper parts of the cut edges have periodically repeating grooves, which can be seen in the thermal image 20 as striations 33. In the region of the cutting front 23, a local minimum 32 with a radiation intensity that is reduced as compared with the intensity in the surroundings occurs in the image 20 of the region of interaction 31 when a good cut is present, i.e. without burr formation. The size of the area F1 of the intensity minimum 32 (radiation sink) can be monitored and, for the case in which the latter decreases too sharply, burr formation can be counteracted by the process parameters being changed suitably.

By using the thermal image from FIG. 8, imminent material burn-up can also be detected. Here, use can be made of the fact that the frequency f of the striations 33 in the thermal image 20 of the region of interaction 31 decreases in the region of that cut edge at which material burn-up is imminent, so that suitable countermeasures can be taken in order to suppress the occurrence of the material burn-up. The striations 33 or a decrease in the frequency f of the striations can alternatively also be detected in the visible range.

In addition, material burn-up that has already arisen and/or is just imminent can be detected by using a rise in the brightness of the overall intensity of the thermal image 20, since the luminescent area observed through the nozzle 6 increases in the event of material burn-up. Additionally or alternatively, material burn-up can also be detected by an increased fluctuation in the overall brightness value as compared with a conventional cutting process.

The thermal images 20 can be compared with the material boundaries (contours of the workpiece 2) detected (at wavelengths in the visible range), in order to improve the determination of values characteristic of the laser cutting process. Here, in particular in the case of workpieces made of stainless steel, a failed cut can be detected when the width of the luminous area registered in the thermal image, which corresponds substantially to the width of the cutting front, is greater than the width A2 of the cut gap at right angles to the feed direction $V_{sheet}$ (cf. FIG. 2).

Both the capturing of the material boundaries and the capturing of the thermal image of the region of interaction in the apparatus shown in FIG. 1 are carried out with the aid of a single camera as image capturing apparatus. For this purpose, the wavelength filter 13 is suitably tuned or suitably moved into the beam path of the process light 8 and out again. For the purpose of parallel detection of material boundaries and thermal image, the image capturing apparatus 10 can also have further cameras and/or detectors.

A number of embodiments have been described. Nevertheless, it will be understood that various modifications may be made without departing from the spirit and scope of the invention. Accordingly, other embodiments are within the scope of the following claims.

What is claimed is:

1. A method for monitoring and for controlling a laser cutting process on a workpiece, the method comprising:
    capturing, by an image capturing apparatus, an image of a region of the workpiece to be monitored,
    detecting, by an evaluation apparatus, material boundaries of the workpiece using the captured image, the material boundaries including edges of a first gap and edges of a second gap cut in the workpiece during the laser cutting process, wherein the second gap does not run parallel to the first gap, determining, by the evaluation apparatus, at least one characteristic value of the laser cutting process based on a geometric relationship between at least two detected material boundaries, the at least one characteristic value including a first gap center of the first gap and a second gap center of the second gap, and determining, by the evaluation apparatus, a position of a tool center point of the laser cutting process both in a x direction and in a y direction in a plane parallel to the workpiece, wherein determining the positon of the tool center point in the x direction is based on the first gap center and wherein determining the positon of the tool center point in the y direction is based on the second gap center.

2. The method according to claim 1, further comprising:
determining, by the evaluation apparatus, a geometric relationship between the tool center point and at least one detected material boundary, and switching, by a control apparatus, a laser beam on or off as a function of the determined geometric relationship.

3. The method of claim 2, further comprising:
determining, by the evaluation apparatus, a geometric relationship between the tool center point and a gap center of a further gap cut in the workpiece in a previous laser cutting process, and switching, by the control apparatus, the laser beam on or off when the gap center of the further gap cut is reached by the tool center point.

4. The method of claim 1, further comprising:
determining, by the evaluation apparatus, a geometric relationship between the tool center point and at least one detected edge of the workpiece, and switching, by a control apparatus, a laser beam on or off when the at least one detected edge is reached by the tool center point.

5. The method of claim 1, wherein the region of the workpiece to be monitored comprises a region of interaction of a laser beam with the workpiece.

* * * * *

UNITED STATES PATENT AND TRADEMARK OFFICE
CERTIFICATE OF CORRECTION

PATENT NO. : 10,058,953 B2
APPLICATION NO. : 15/419190
DATED : August 28, 2018
INVENTOR(S) : Tim Hesse and David Schindhelm Page 1 of 1

It is certified that error appears in the above-identified patent and that said Letters Patent is hereby corrected as shown below:

On the Title Page

Item (63)
Column 1 (Related U.S. Application Data), Line 5, below "Feb. 1, 2012." insert -- Feb. 07, 2011 (DE) 102011003717.9 -- as a new field entry In the Claims Column 15
Line 13, in Claim 1, delete "positon" and insert -- position --
Line 15, in Claim 1, delete "positon" and insert -- position --

Signed and Sealed this
Twenty-fifth Day of December, 2018

Andrei Iancu
*Director of the United States Patent and Trademark Office*